United States Patent
Li et al.

(10) Patent No.: US 9,955,162 B2
(45) Date of Patent: Apr. 24, 2018

(54) PHOTO CLUSTER DETECTION AND COMPRESSION

(71) Applicant: LENOVO (Singapore) PTE. LTD., New Tech Park (SG)

(72) Inventors: Scott Wentao Li, Cary, NC (US); Marco Alberto Gonzalez, Durham, NC (US); Grigori Zaitsev, Durham, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/674,390

(22) Filed: Mar. 31, 2015

(65) Prior Publication Data
US 2016/0295064 A1    Oct. 6, 2016

(51) Int. Cl.
*H04N 5/228* (2006.01)
*H04N 5/76* (2006.01)
*H04N 19/119* (2014.01)
*H04N 19/137* (2014.01)
*H04N 19/179* (2014.01)

(52) U.S. Cl.
CPC ........ *H04N 19/119* (2014.11); *H04N 19/137* (2014.11); *H04N 19/179* (2014.11)

(58) Field of Classification Search
CPC ........ H04N 19/00–19/99; H04N 5/144–5/145; H03M 7/30–7/707; G06F 17/30244–17/3028
USPC ... 348/154, 155, 208.2, 231.2, 231.3, 231.5, 348/384.1–440.1; 382/232–253, 117; 396/54
See application file for complete search history.

(56) References Cited

U.S. PATENT DOCUMENTS

| | | | |
|---|---|---|---|
| 6,351,556 B1 * | 2/2002 | Loui | G06K 9/4647 |
| | | | 382/164 |
| 7,248,741 B2 * | 7/2007 | Akimoto | G06T 7/20 |
| | | | 375/240.16 |
| 8,508,605 B2 * | 8/2013 | Dolgin | H04N 5/23248 |
| | | | 348/208.1 |
| 8,655,085 B2 | 2/2014 | Khawand et al. | |
| 2006/0002611 A1 * | 1/2006 | Mantiuk | H04N 19/46 |
| | | | 382/239 |
| 2006/0078315 A1 * | 4/2006 | Wada | G11B 27/34 |
| | | | 386/230 |

(Continued)

FOREIGN PATENT DOCUMENTS

| | | |
|---|---|---|
| JP | 2001223921 A | 8/2001 |
| JP | 2010016847 A | 1/2010 |
| JP | 2012182576 A | 9/2012 |

OTHER PUBLICATIONS

U.S. Appl. No. 15/336,647 Office Action Summary, dated Dec. 28, 2017, pp. 1-22.

*Primary Examiner* — Xi Wang
(74) *Attorney, Agent, or Firm* — Kunzler, PC (57) ABSTRACT

Apparatuses, methods, systems, and program products are disclosed for photo cluster detection and compression. An image module receives a set of images captured using a camera. A subset module determines a subset of the set of images based on a timestamp associated with each image of the set of images. The subset of images includes a plurality of images having a timestamp within a predefined time range. A compression module compresses the subset of images such that the compressed subset of images uses less storage space than the subset of images.

17 Claims, 6 Drawing Sheets

(56) References Cited

U.S. PATENT DOCUMENTS

| | | | |
|---|---|---|---|
| 2006/0083421 A1 | 4/2006 | Weiguo et al. | |
| 2006/0104528 A1* | 5/2006 | Tamura | H04N 19/60 |
| | | | 382/239 |
| 2011/0242123 A1* | 10/2011 | Momosaki | G06F 17/30056 |
| | | | 345/581 |
| 2013/0135295 A1 | 5/2013 | Li et al. | |
| 2014/0314322 A1 | 10/2014 | Snavely et al. | |
| 2015/0043833 A1 | 2/2015 | Ma et al. | |
| 2015/0054975 A1* | 2/2015 | Emmett | H04N 5/23245 |
| | | | 348/220.1 |
| 2015/0169635 A1* | 6/2015 | Jing | G06F 17/30867 |
| | | | 707/723 |
| 2015/0281509 A1* | 10/2015 | Legakis | H04N 5/23264 |
| | | | 348/231.2 |
| 2016/0034753 A1 | 2/2016 | Harada | |
| 2016/0125633 A1 | 5/2016 | Windmark et al. | |
| 2016/0241817 A1* | 8/2016 | Sun | H04N 5/23293 |

\* cited by examiner

PHOTO CLUSTER DETECTION AND COMPRESSION

BACKGROUND

Field

The subject matter disclosed herein relates to digital photography and more particularly relates to photo cluster detection and compression.

Description of the Related Art

Various information handling devices include image capture devices, such as digital cameras. For example, a smart phone or tablet computer may include a plurality of integrated digital cameras. Many digital cameras capture images that have high resolutions, e.g., high pixel counts, which generates images of higher quality. However, higher resolution images consume more storage space. Some cameras have a burst image mode where a plurality of continuous images are captured within a short time period. Capturing high resolution images while using a burst image mode can rapidly consume a large amount of storage space of an information handling device.

BRIEF SUMMARY

An apparatus for photo cluster detection and compression is disclosed. A method and program product also perform the functions of the apparatus. In one embodiment, an apparatus includes a camera and a processor operably coupled to the camera. The apparatus, in certain embodiments, includes a memory that stores code executable by the processor. The apparatus includes code that receives a set of images captured using the camera. In a further embodiment, the apparatus includes code that determines a subset of the set of images based on a timestamp associated with each image of the set of images. The subset of images may comprise a plurality of images having a timestamp within a predefined time range. The apparatus may include code that compresses the subset of images such that the compressed subset of images uses less storage space than the subset of images.

In various embodiments, the apparatus includes codes that determines a plurality of images of the subset of images that are related based on one or more features of the images. In certain embodiments, an image that does not have substantially similar features as a different image is removed from the subset of images. The apparatus, in a further embodiment, includes code that determines a plurality of images of the subset of images that are related based on motion sensor data associated with each image of the subset of images. In one embodiment, an image is removed from the subset of images in response to a correlation between its motion sensor data and the motion sensor data of a different image not having a correlation above a threshold correlation.

In one embodiment, the motion sensor data comprises data generated by a sensor at a time that an image is captured. In a further embodiment, the sensor is selected from the group consisting of an accelerometer and an orientation sensor. In some embodiments, the motion sensor data for an image is stored as metadata with the image. In various embodiments, the threshold correlation is about 0.7.

The apparatus, in some embodiments, includes code that determines a plurality of images of the subset of images that are related based on location data associated with each image of the subset of images. In one embodiment, an image is removed from the subset of images in response to a distance between its location and a location of a different image being greater than a threshold distance. The apparatus, in one embodiment, includes code that deletes images that are in the compressed subset of images from the set of images. In a further embodiment, the subset of images is compressed using a lossless compression method.

A method, in one embodiment, includes receiving, by use of a processor, a set of images captured using a camera. In some embodiments, the method includes determining a subset of the set of images based on a timestamp associated with each image of the set of images. In a further embodiment, the subset of images includes a plurality of images that have a timestamp within a predefined time range. In certain embodiments, the method includes compressing the subset of images such that the compressed subset of images uses less storage space than the subset of images.

In one embodiment, the method includes determining a plurality of images of the subset of images that are related based on one or more features of the images. In some embodiments, an image that does not include substantially similar features as a different image is removed from the subset of images. In a further embodiment, the method includes determining a plurality of images of the subset of images that are related based on motion sensor data associated with each image of the subset of images. In some embodiments, an image is removed from the subset of images in response to a correlation between its motion sensor data and the motion sensor data of a different image not having a correlation above a threshold correlation. In one embodiment, the motion sensor data comprises data generated by a sensor at a time that an image is captured. The sensor may be selected from the group consisting of an accelerometer and an orientation sensor.

In some embodiments, the method includes determining a plurality of images of the subset of images that are related based on location data associated with each image of the subset of images. In certain embodiments, an image is removed from the subset of images in response to a distance between its location and a location of a different image being greater than a threshold distance. In a further embodiment, the method includes code that deletes images that are in the compressed subset of images from the set of images.

A program product, in one embodiment, includes a computer readable storage medium that stores code executable by a processor. In one embodiment, the executable code includes code to perform receiving a set of images captured using a camera. In a further embodiment, the executable code includes code to perform determining a subset of the set of images based on a timestamp associated with each image of the set of images. In one embodiment, the subset of images includes a plurality of images having a timestamp within a predefined time range. In certain embodiments, the executable code includes code to perform compressing the subset of images such that the compressed subset of images uses less storage space than the subset of image.

In one embodiment, the executable code includes code to perform determining a plurality of images of the subset of images that are related based on one or more features of the images. In a further embodiment, an image that does not have substantially similar features as a different image is removed from the subset of images.

In various embodiments, the executable code includes code to perform determining a plurality of images of the subset of images that are related based on motion sensor data associated with each image of the subset of images. In one embodiment, an image is removed from the subset of images in response to a correlation between its motion sensor data and the motion sensor data of a different image not having a correlation above a threshold correlation.

In one embodiment, the executable code includes code to perform determining a plurality of images of the subset of images that are related based on location data associated with each image of the subset of images. In one embodiment, an image is removed from the subset of images in response to a distance between its location and a location of a different image being greater than a threshold distance.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
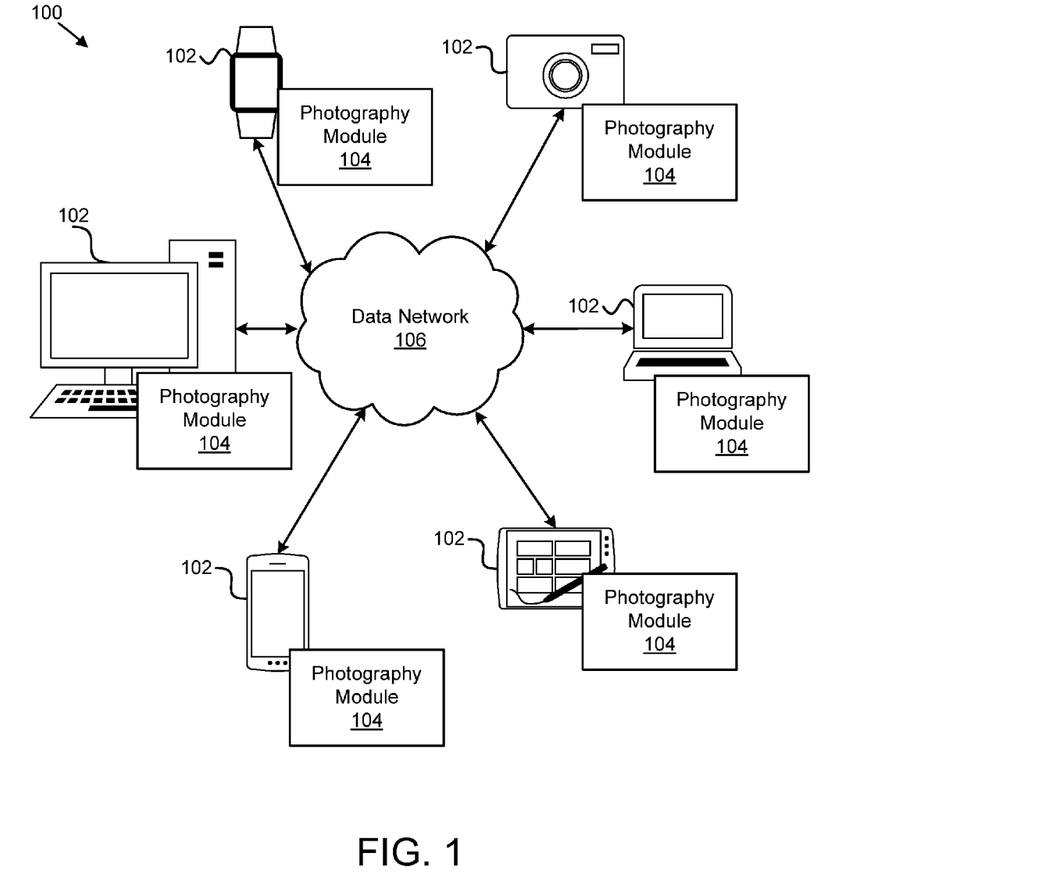
FIG. 1 is a schematic block diagram illustrating one embodiment of a system for photo cluster detection and compression.

FIG. 1 is a schematic block diagram illustrating one embodiment of a system 100 for photo cluster detection and compression. In one embodiment, the system 100 includes information handling devices 102, photography modules 104, and data networks 106. In certain embodiments, even though a specific number information handling devices 102, photography modules 104, and data networks 106 are depicted in FIG. 1, one of skill in the art will recognize that any number of information handling devices 102, photography modules 104, and data networks 106 may be included in the system 100 for photo cluster detection and compression.

In one embodiment, the information handling devices 102 include desktop computers, laptop computers, personal digital assistants (PDAs), tablet computers, smart phones, smart televisions (e.g., televisions connected to the Internet), set-top boxes, game consoles, digital cameras, or the like. In some embodiments, the information handling devices 102 comprise wearable devices, such as smart watches, fitness bands, optical head-mounted displays, or the like.

In certain embodiments, the information handling devices 102 include servers, blade servers, virtual servers, cloud servers, servers of a data center, or the like. The servers may be configured as application servers, email servers, database servers, file servers, game servers, home servers, media servers, web servers, and/or the like. In certain embodiments, the servers are communicatively coupled to other information handling devices 102 via the data network 106 such that the information handling devices 102 may store and/or access data on the servers as it relates to the photography module 104.

The information handling devices 102 may be configured with a camera, or a similar component, that is configured to capture digital images. The information handling devices 102, in various embodiments, include software and/or hardware for performing digital image processing, such as image compression, image manipulation, image feature detection (e.g., detecting edges, corners, interest points, blobs, ridges, etc.), and/or the like. In a further embodiment, the information handling devices 102 include one or more sensors, such as motion sensors, proximity sensors, accelerometers, orientation sensors, or the like.

In one embodiment, the photography module 104 is configured to receive a set of images captured using a camera, and determine a subset of the set of images based on a timestamp associated with each image of the set of images. In some embodiments, the subset of images comprises a plurality of images that have a timestamp that is within a predefined time range. In certain embodiments, the photography module 104 is configured to compress the subset of images such that the compressed subset of images uses less storage space than the subset of images.

In this manner, the photography module 104 determines whether a plurality of images that were not captured in a burst mode setting of a camera are related. Generally, images captured in a burst mode setting comprise a photo cluster, and may be designated as such. As used herein, a burst mode setting on a camera is a shooting mode where several photographs are captured in quick succession by either pressing the shutter button or holding it down. Thus, the photography module 104, in one embodiment, identifies images that are not captured in a burst mode setting, but may nevertheless comprise a photo cluster. In some embodiments, a user defines the boundaries of what constitutes a photo cluster, as described in more detail below.

The data network 106, in one embodiment, comprises a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

Figure 2:
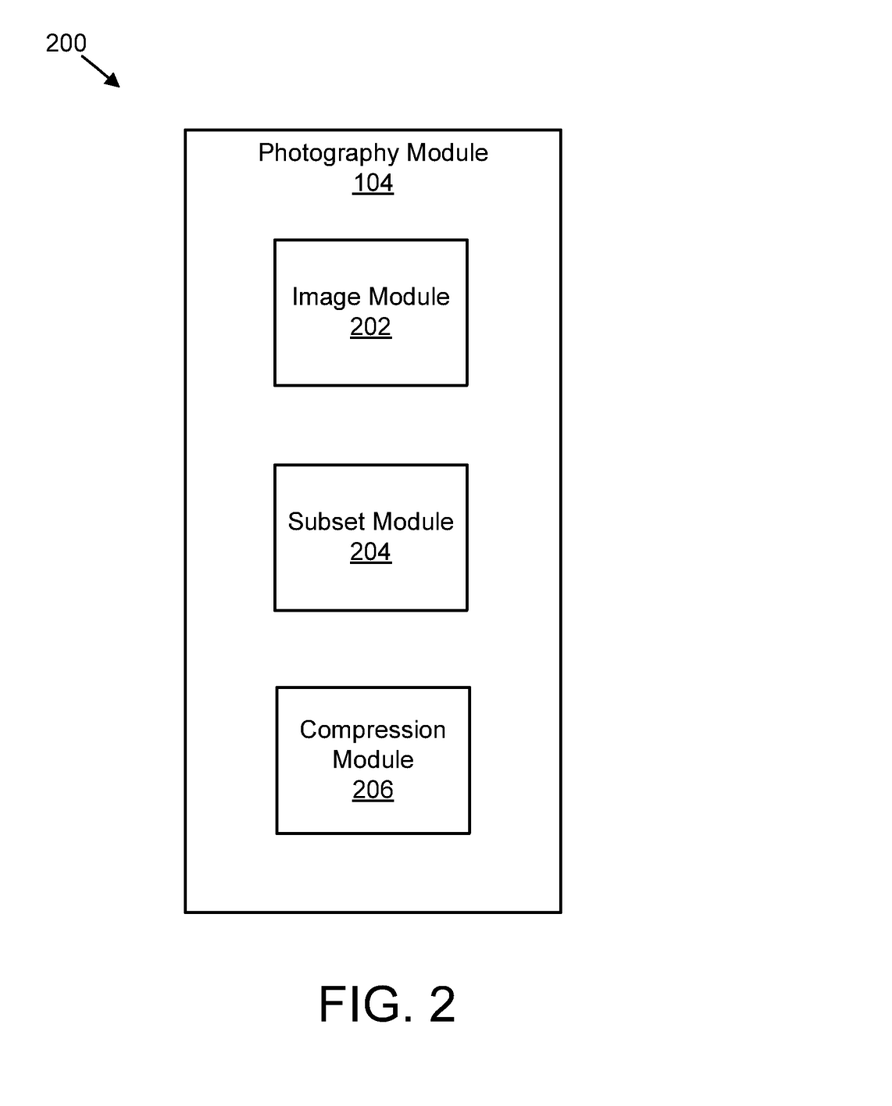
FIG. 2 is a schematic block diagram illustrating one embodiment of a module for photo cluster detection and compression.

FIG. 2 is a schematic block diagram illustrating one embodiment of a module 200 for photo cluster detection and compression. In one embodiment, the module 200 includes an embodiment of a photography module 104. The photography module 104, in some embodiments, includes one or more of an image module 202, a subset module 204, and a compression module 206, which are described in more detail below.

The image module 202, in one embodiment, is configured to receive a set of images. In certain embodiments, the set of images comprises a plurality of images that have been captured using a digital camera, or the like. In various embodiments, the set of images comprises a plurality of images stored in various formats, such as raster or vector formats, compressed or uncompressed formats, or the like. For example, the set of images may comprise images stored as images compressed using a Joint Photographic Experts Group (JPEG) format, an Exchangeable Image File Format (EXIF), a Tagged Image File Format (TIFF), a raw image format (RIF), a Scalable Vector Graphics (SVG) format, and/or the like.

In some embodiments, the set of images is located on an information handling device 102 comprising the camera that captured the images. For example, the set of images may be stored on a digital camera, smart phone, a smart watch, a laptop computer, a tablet computer, a desktop computer, or the like. In a further embodiment, the set of images may be transferred to, and stored on, a cloud server, a network server, or the like.

The image module 202 may request and/or receive the set of images from a storage volume associated with the set of images, e.g., a storage volume where the set of images are stored. For example, if the image module 202 is located on a smart phone, the image module 202 may receive the set of images from a local storage volume located on the smart phone or from a cloud storage volume if the set of images are stored on a cloud server.

In one embodiment, the subset module 204 is configured to determine a subset of the set of images received by the image module 202 to be a candidate for compression. In certain embodiments, the subset module 204 determines a subset of the set of images based on a timestamp associated with each image of the set of images. Each image, for example, may comprise a timestamp that indicates a time and/or date that the image was captured with the camera. In certain embodiments, the timestamp associated with an image is stored in metadata associated with the image.

In some embodiments, the subset of images includes images that have a timestamp that falls within a predefined time range. For example, the subset module 204 may determine a subset of images that were taken on August 2, between 3:00 PM and 4:00 PM, and were taken within 10 milliseconds of each other. In another example, the subset module 204 may generate a plurality of subsets of images where each subset comprises images taken within a one second time range. Thus, a subset may comprise 10 images that were taken within a one second time range, and another subset may comprise 2 images that were taken within a different one second time range. In some embodiments, if the subset module 204 determines that a subset only contains a single image, the subset module 204 may not designate the subset as a valid subset candidate for compression, as described below.

In various embodiments, the predefined time range may be defined by a user. For example, a user may specify the period of time for the images that the subset module 204 receives (e.g., a date range and/or a time range such as August 2, from 3:00 PM to 4:00 PM) and/or a time range between images (e.g., images taken within 10 ms of one another) to determine which images belong to the subset.

In one embodiment, the subset module 204 determines a subset of images for compression according to a schedule. In some embodiments, the subset module 204 determines one or more subsets of images on an hourly, daily, or weekly basis. For example, a subset module 204 located on a digital camera or a smart phone may determine a subset of images for compression on a daily basis to conserve an amount of storage space that is consumed by the images. In some embodiments, the subset module 204 determines a subset of images based on a user-defined schedule. A user, for example, may specify when and/or how often the subset module 204 determines subsets of images for compression.

The compression module 206, in one embodiment, is configured to compress the subset of images such that the compressed subset of images uses less storage space than the uncompressed subset of images. In some embodiments, the compression module 206 uses a lossless image compression algorithm to compress the subset of images. For example, the compression module 206 may use a center-weighted lossless compression algorithm. Types of lossless compression algorithms may include JPEG-LS, JPEG 2000, JPEG XR, PGF, PNG, TIFF, or the like.

In certain embodiments, after the compression module 206 compresses the subset of images, the image module 202 deletes the images that are in the compressed subset of images from the original set of images. In this manner, the photography module 104 can conserve storage space on an information handling device 102 by determining which images comprise a photo cluster, which may be similar to a photo cluster that is captured while a camera is in a burst mode, compressing the images comprising the photo cluster, and deleting the original images.

Figure 3:
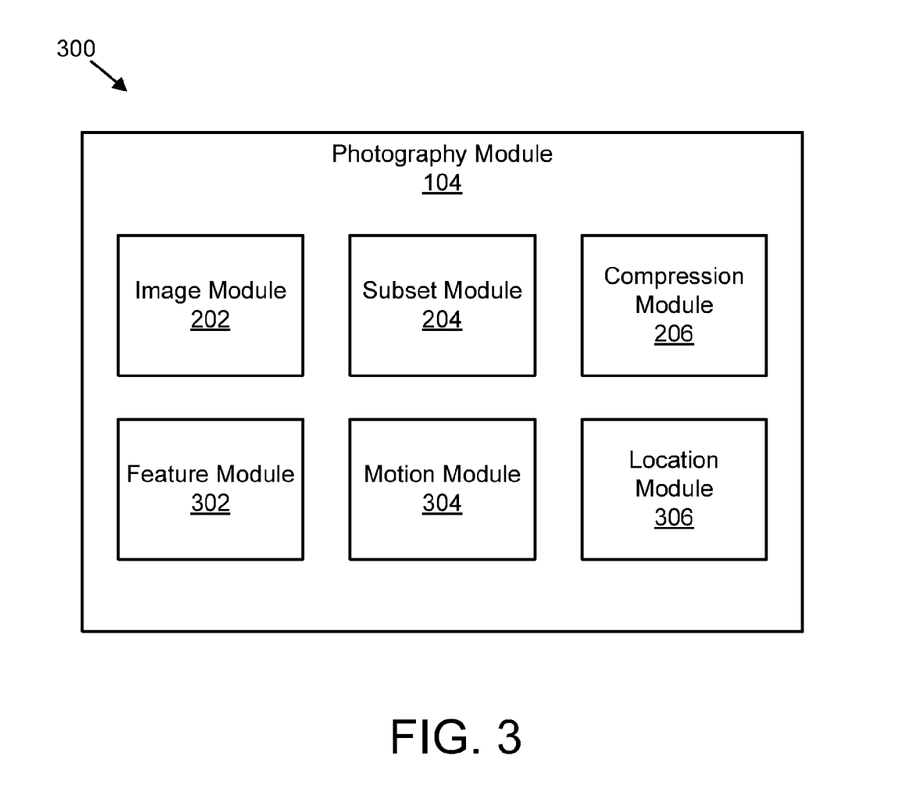
FIG. 3 is a schematic block diagram illustrating one embodiment of another module for photo cluster detection and compression.

FIG. 3 is a schematic block diagram illustrating one embodiment of another module 300 for photo cluster detection and compression. In one embodiment, the module 300 includes an embodiment of a photography module 104. The photography module 104 may include one or more of an image module 202, a subset module 204, and a compression module 206, which may be substantially similar to the image module 202, the subset module 204, and the compression module 206 described above with reference to FIG. 2. In a further embodiment, the photography module 104 includes one or more of a feature module 302, a motion module 304, and a location module 306, which are described in more detail below.

In one embodiment, the feature module 302 is configured to refine a subset of images determined by the subset module 204 by determining a plurality of images of the subset of images that are related based on one or more features of the images. In such an embodiment, images that are not related are removed from the subset of images. For example, the feature module 302 may remove an image from the subset of images if the image does not comprise substantially similar features as a different image.

As used herein, image features may include edges, ridges, points of interest, corners, or the like within an image. For example, the image features may detect skylines, trees, objects, people, or the like within an image. The feature module 302 may determine whether two images share similar edges or points of interest, meaning the two images have edges or points of interest in substantially the same location within the image, to determine whether the images are related. If the feature module 302 determines the features of the images are substantially similar, then the images are considered related and will remain in the subset. Otherwise, the feature module 302 may determine whether the features of the images are substantially similar to features of the other images in the subset, and, if not, the images are removed from the subset.

The feature module 302, in one embodiment, may use a similarity filter to determine whether the features of two images are substantially similar. A feature correlation threshold may be used to determine how one image's feature set correlates to a different image's feature set. Based on the resulting correlation and a correlation threshold, the feature module 302 may determine whether the two images' feature sets are substantially similar.

In one embodiment, the motion module 304 is configured to refine a subset of images determined by the subset module 204 by determining a plurality of images of the subset of images that are related based on motion sensor data associated with each image of the subset of images. As described above, an information handling device 102 may comprise sensors such as accelerometers and orientation sensors, for example. When an image is captured using an information handling device 102 that includes these sensors, the data generated by the sensors at the time the image is captured is stored with the image as metadata. The motion module 304 may determine whether the differences between the motion sensor data between two different images is above or within a threshold correlation, and, if so, may consider the images related.

For example, if the motion module 304 determines that the correlation of accelerometer data between two images is above a correlation threshold, the motion module 304 may consider the two images related. Accordingly, a higher correlation between two sets of motion sensor data may indicate that the images are part of the same photo cluster, e.g., the images were taken at substantially the same time or as part of a continuous photo shoot. Consequently, the higher the correlation threshold is set to, the more related the images will be in terms of the amount of motion detected between the two images. In other words, if an image is taken and then the camera is moved and another image is taken, the motion module 304 determines whether the amount of detected movement between the two images is enough to consider the images to be related.

In some embodiments, the threshold correlation is between 0.9 and 1.0, which may indicate that there is little to no detected movement between the images. In a further embodiment, the threshold correlation is about 0.7, which may indicate that there is some detected movement between the images, but they may still be considered related images. The threshold correlation, in some embodiments, may be about 0.5 in order to include more images in the subset. The threshold correlation may be defined by a user.

In one embodiment, the location module 306 is configured to refine a subset of images determined by the subset module 204 by determining a plurality of images of the subset of images that are related based on location data associated with each image of the subset of images. As used herein, location data may comprise GPS data, GSM data, control plane localization data, self-reported positioning data, or the like. In some embodiments, the location data is stored as metadata associated with an image. The location data may identify a location where an image was taken.

In one example, the location module 306 may associate a city where the image was taken with the image. In another example, the location module 306 may associate an address where the image was taken with the image. In a further example, the location module 306 may associated a GPS coordinate where the image was taken with the image. In various examples, the location module 306 may associated a user-defined location with an image that represents the location that the image was taken.

To determine whether a plurality of images of the subset of images are related based on the location data, the location module 306 determines whether the distance between the images' locations are greater than a threshold distance. In some embodiments, the threshold distance may comprise a number of feet, yards, miles, or the like. For example, if the location module 306 determines that the distance between the location data for a pair of images is greater than the set threshold distance of 10 feet, then the location module 306 may determine that the images are not related, meaning that at least one of the images may be removed from the subset. The threshold distance, in some embodiments, may be set by a user.

In each instance of the feature module 302, the motion module 304, and the location module 306, the data that is being compared between images, in some embodiments, is compared in a temporal order, e.g., in the order that the images were captured according to the timestamps associated with each image. For example, for a subset of five images A-E, the metadata for image A may be compared to the metadata for image B, and the metadata for image B may be compared to the metadata for image C, and so forth. Thus, the metadata of images is compared in order such that the metadata for image A is not compared to the metadata for image E, whether it be feature data, motion sensor data, and/or location data. In this manner, the resulting subset is a more accurate representation of a photo cluster without removing images that should be included in the subset.

Figure 4:
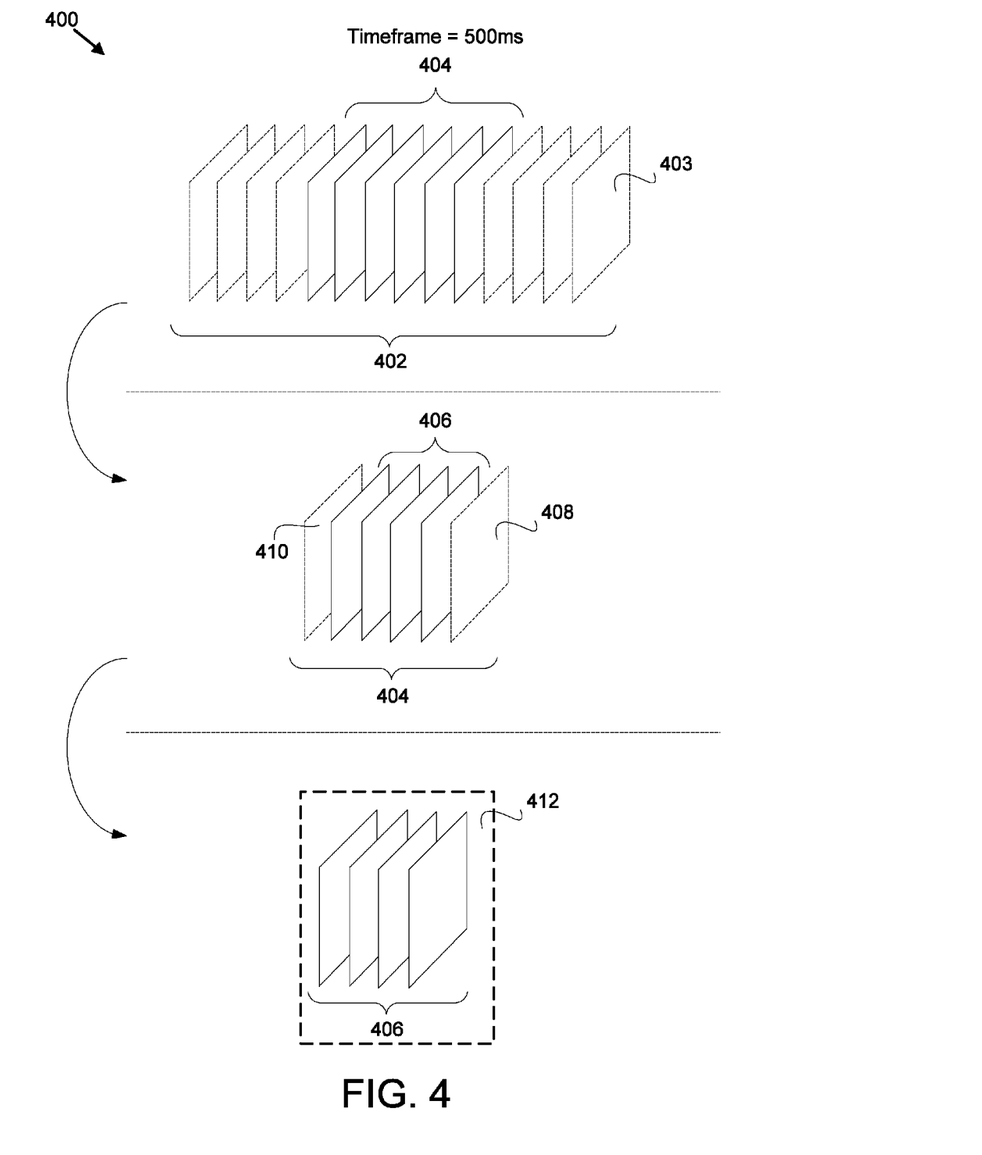
FIG. 4 is a schematic block diagram illustrating one embodiment of photo cluster detection and compression.

FIG. 4 is a schematic block diagram illustrating one embodiment of photo cluster detection and compression for a plurality of images 403. In one embodiment, the image module 202 receives a set of images 402 and the subset module 204 determines a subset 404 of the set of images 402. The subset 404 may comprise a plurality of images 403 that were taken within a predefined time range, in this case the subset comprises images taken within a 500 ms time frame.

The subset of images 404 may be further refined based on feature data, motion sensor data, and/or location data to determine a different subset of related images 406. For example, an image 408 may be removed if its motion sensor data does not have a correlation above a correlation threshold with the motion sensor data of a different image. In another example, an image 410 may be excluded from the subset if its feature data does is not substantially similar to the feature data of a different image. The compression module 206 may compress the resulting subset 406 to create a compressed subset of images 412. The image module 202, in one embodiment, removes the images in the compressed subset 412 from the original set of images 402.

Figure 5:
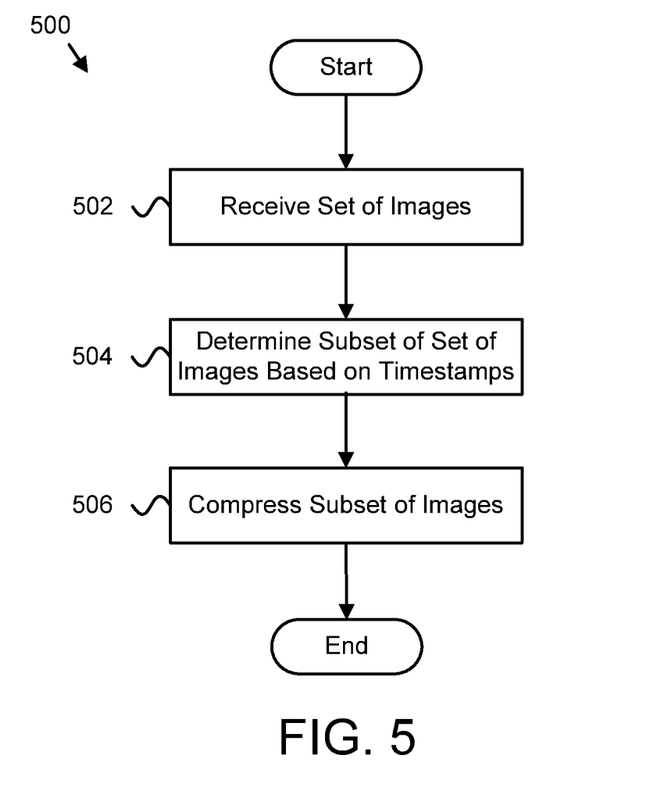
FIG. 5 is a schematic flow chart diagram illustrating one embodiment of a method for photo cluster detection and compression.

FIG. 5 is a schematic flow chart diagram illustrating one embodiment of a method 500 for photo cluster detection and compression. In one embodiment, the image module 202 receives 502 a set of images captured using a camera. In a further embodiment, the subset module 204 determines 504 a subset of the set of images based on a timestamp associated with each image of the set of images. The subset of images may comprise a plurality of images that have a timestamp within a predefined time range. The compression module 206, in one embodiment, compresses 506 the subset of images such that the compressed subset of images used less storage space than the subset of images, and the method 500 ends.

Figure 6:
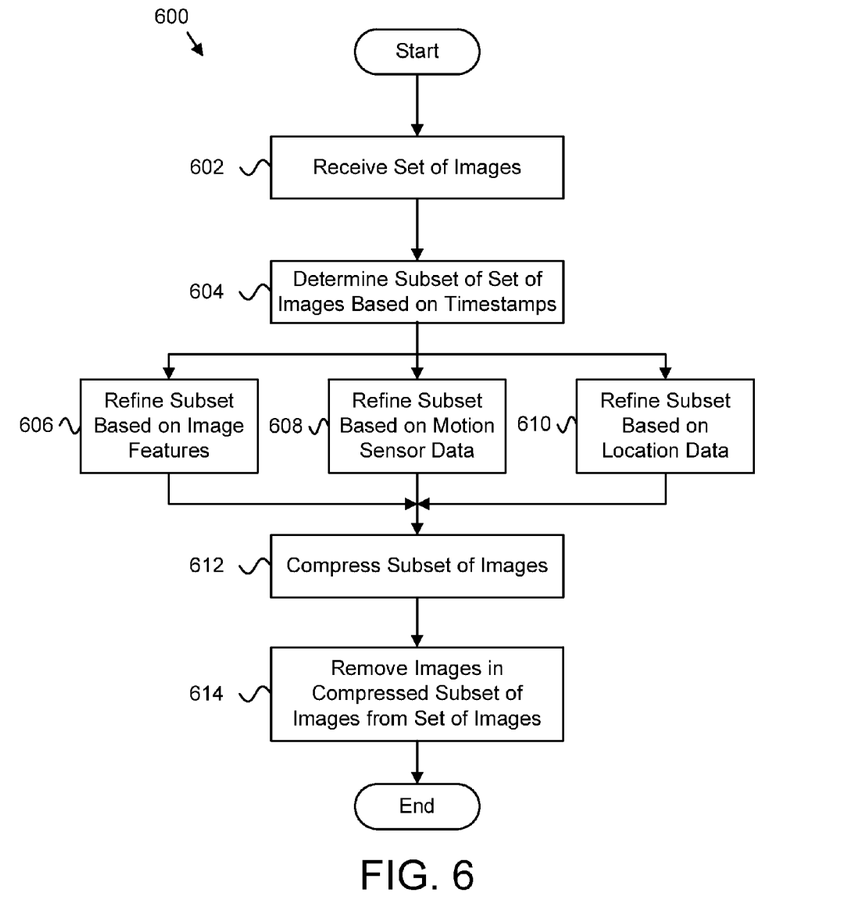
FIG. 6 is a schematic flow chart diagram illustrating one embodiment of another method for photo cluster detection and compression.

FIG. 6 is a schematic flow chart diagram illustrating one embodiment of another method 600 for photo cluster detection and compression. In one embodiment, the image module 202 receives 602 a set of images captured using a camera. The subset module 204, in some embodiments, determines 604 a subset of the set of images based on a timestamp associated with each image of the set of images. The subset of images may comprise a plurality of images that have a timestamp within a predefined time range.

In one embodiment, the feature module 302 refines 606 the subset of images based on one or more features of the images such that an image that does not comprise substantially similar features as a different image is removed from the subset of images. In a further embodiment, the motion module 304 refines 608 the subset of images based on motion sensor data associated with each image such that an image is removed from the subset in response to a correlation between its motion sensor data and the motion sensor data of a different image not having a correlation above a threshold correlation. In some embodiments, the location module 306 refines 610 the subset of images based on location data associated with each image such that an image is removed from the subset in response to a distance between its location and a location of a different image being greater than a threshold distance.

The compression module 206 compresses 612 the subset of images such that the compressed subset of images uses less storage space than the subset of images. The image module 202 removes/deletes 614 images in the compressed subset of images from the original set of images to make available storage space, and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a camera;
   a processor operably coupled to the camera;
   a memory that stores code executable by the processor, the code comprising:
     code that receives a set of images captured using the camera;
     code that determines a subset of the set of images based on a timestamp associated with each image of the set of images, the subset of images comprising a plurality of images having a timestamp within a predefined time range;
     code that receives motion sensor data associated with each image of the subset of images, the motion sensor data describing a physical state of the camera when the image is captured;
     code that determines, for each image in the subset of images, whether a correlation between an image's motion sensor data and a different image's motion sensor data satisfies a threshold correlation, the threshold correlation defining an amount of camera movement between each image that is acceptable to keep an image in the subset of images, a correlation between the image and one or more other images that satisfies the threshold correlation indicating the image and the one or more other images are related;
     code that removes each image from the subset of images that has a correlation with one or more other images in the subset of images that is less than the threshold correlation, a correlation between the image and the one or more other images that is less than the threshold correlation indicating the image and the one or more other images are not related; and
     code that compresses the remaining images in the subset of images such that the compressed subset of images uses less storage space than the subset of images.

2. The apparatus of claim 1, further comprising code that determines a plurality of images of the subset of images that are related based on one or more features of the images, wherein an image not comprising substantially similar features as a different image is removed from the subset of images.

3. The apparatus of claim 1, wherein the motion sensor data comprises data generated by a sensor at a time that an image is captured.

4. The apparatus of claim 3, wherein the sensor is selected from the group consisting of an accelerometer and an orientation sensor.

5. The apparatus of claim 1, wherein the motion sensor data for an image is stored as metadata with the image.

6. The apparatus of claim 1, wherein the threshold correlation is 0.7.

7. The apparatus of claim 1, further comprising code that determines a plurality of images of the subset of images that are related based on location data associated with each image of the subset of images, wherein an image is removed from the subset of images in response to a distance between its location and a location of a different image being greater than a threshold distance.

8. The apparatus of claim 1, further comprising code that deletes images that are in the compressed subset of images from the set of images.

9. The apparatus of claim 1, wherein the subset of images is compressed using a lossless compression method.

10. A method comprising:
receiving, by use of a processor, a set of images captured using a camera;
determining a subset of the set of images based on a timestamp associated with each image of the set of images, the subset of images comprising a plurality of images having a timestamp within a predefined time range; and
receiving motion sensor data associated with each image of the subset of images, the motion sensor data describing a physical state of the camera when the image is captured;
determining, for each image in the subset of images, whether a correlation between an image's motion sensor data and a different image's motion sensor data satisfies a threshold correlation, the threshold correlation defining an amount of camera movement between each image that is acceptable to keep an image in the subset of images, a correlation between the image and one or more other images that satisfies the threshold correlation indicating the image and the one or more other images are related;
removing each image from the subset of images that has a correlation with one or more other images in the subset of images that that is less than the threshold correlation, a correlation between the image and the one or more other images that is less than the threshold correlation indicating the image and the one or more other images are not related; and
compressing the remaining images in the subset of images such that the compressed subset of images uses less storage space than the subset of images.

11. The method of claim 10, further comprising determining a plurality of images of the subset of images that are related based on one or more features of the images, wherein an image not comprising substantially similar features as a different image is removed from the subset of images.

12. The method of claim 10, wherein the motion sensor data comprises data generated by a sensor at a time that an image is captured, the sensor being selected from the group consisting of an accelerometer and an orientation sensor.

13. The method of claim 10, further comprising determining a plurality of images of the subset of images that are related based on location data associated with each image of the subset of images, wherein an image is removed from the subset of images in response to a distance between its location and a location of a different image being greater than a threshold distance.

14. The method of claim 10, further comprising code that deletes images that are in the compressed subset of images from the set of images.

15. A program product comprising a non-transitory computer readable storage medium that stores code executable by a processor, the executable code comprising code to perform:
receiving a set of images captured using a camera;
determining a subset of the set of images based on a timestamp associated with each image of the set of images, the subset of images comprising a plurality of images having a timestamp within a predefined time range;
receiving motion sensor data associated with each image of the subset of images, the motion sensor data describing a physical state of the camera when the image is captured;
determining, for each image in the subset of images, whether a correlation between an image's motion sensor data and a different image's motion sensor data satisfies a threshold correlation, the threshold correlation defining an amount of camera movement between each image that is acceptable to keep an image in the subset of images, a correlation between the image and one or more other images that satisfies the threshold correlation indicating the image and the one or more other images are related;
removing each image from the subset of images that has a correlation with one or more other images in the subset of images that that is less than the threshold correlation, a correlation between the image and the one or more other images that is less than the threshold correlation indicating the image and the one or more other images are not related; and
compressing the remaining images in the subset of images such that the compressed subset of images uses less storage space than the subset of images.

16. The program product of claim 15, the executable code further comprising code to perform determining a plurality of images of the subset of images that are related based on one or more features of the images, wherein an image not comprising substantially similar features as a different image is removed from the subset of images.

17. The program product of claim 15, the executable code further comprising code to perform determining a plurality of images of the subset of images that are related based on location data associated with each image of the subset of images, wherein an image is removed from the subset of images in response to a distance between its location and a location of a different image being greater than a threshold distance.

* * * * *